March 31, 1959  B. SIMMONS  2,879,865
LOCK WHEEL MECHANIC'S CREEPER
Filed May 7, 1957  2 Sheets-Sheet 1

Ballard Simmons
INVENTOR.

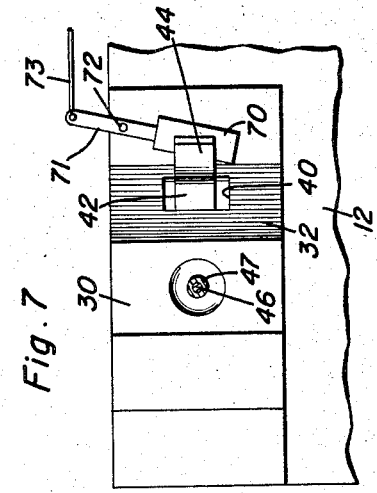

United States Patent Office 2,879,865
Patented Mar. 31, 1959

2,879,865
LOCK WHEEL MECHANIC'S CREEPER
Ballard Simmons, Lucasville, Ohio
Application May 7, 1957, Serial No. 657,597
5 Claims. (Cl. 188—69)

This invention relates to a mechanic's creeper and more particularly to a creeper which is provided with brakes for at least one wheel thereof.

An object of the present invention is to provide a creeper with brakes for one, two, three or four wheels, the brakes being under the control of the mechanic whereby he may apply the brakes when he is in a prone position working on an automobile, truck or other device. In this way dangerous accidents which are ossasioned by inadvertent sliding of the creeper, may be avoided. With regard to this, when a mechanic is working on an automobile, for example on the transmission thereof, resting on his back and upon a creeper, often the mechanic exerts considerable effort with his arms and his body thereby lifting his body, twisting it and pulling. The result is that once in a while the creeper will be pushed severely due to reaction forces generated by the mechanic. If the creeper is not firmly fixed, it will slide and this reactive force will be directed in such a manner that an accident could occur.

A further object of the invention is to provide a creeper with brakes to facilitate the use thereof by the mechanic. These brakes are preferably applied to all four wheels of the creeper, however, it is within the purview of the invention to utilize brakes on two wheels, or even on one or three wheels thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a transverse sectional view taken approximately on the line 3—3 of Figure 2;

Figure 4 is a sectional view taken on the line 4—4 of Figure 3 and showing the brakes of one wheel in the disengaged position;

Figure 5 is a sectional view similar to that of Figure 4 but showing the brakes on the same wheel in the engaged position;

Figure 6 is a sectional view taken on the line 6—6 of Figure 4; and

Figure 7 is a sectional view taken on the line 7—7 of Figure 5.

Figures 1, 2:
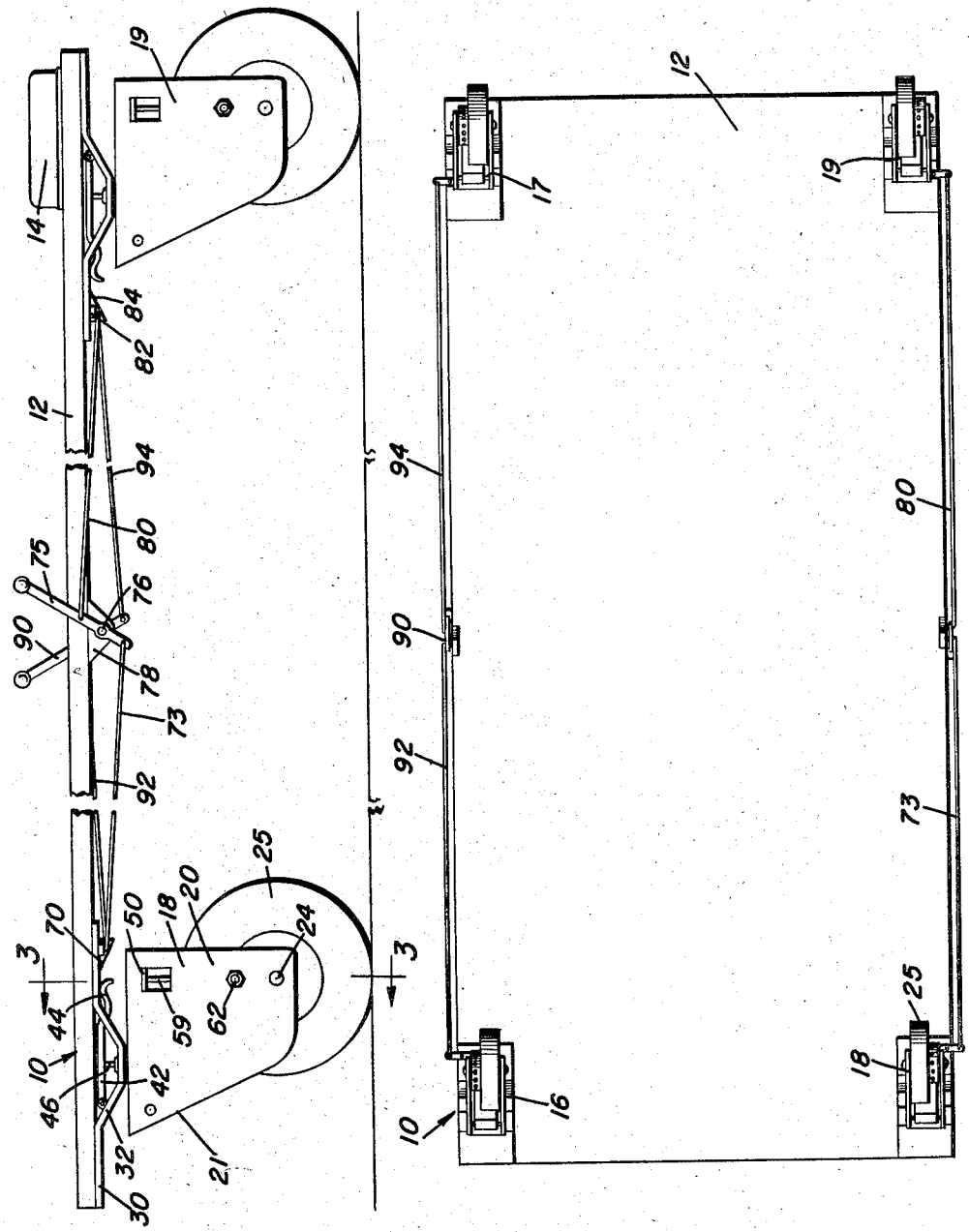
Figure 1 is a bottom plan view of the creeper constructed in accordance with the invention.
Figure 2 is an elevational side view of the creeper in Figure 1.

In the accompanying drawings there is a creeper 10 which is constructed in accordance with the invention. This creeper comprises a body 12 which is of a flat panel configuration, this part being standard and usually made of wood and provided with a head rest 14. There are four wheel assemblies 16, 17, 18, and 19 respectively, one wheel assembly being at each corner of the creeper panel. Wheel assembly 18 is made of a generally U-shaped fork 20 having sides 21 and 22 and an upper cross member 23. Axle 24 is passed through aligned holes in the sides 21 and 22 and supports wheel 25 for rotation thereon. Wheel 25 has a hub 26 that protrudes laterally of wheel 25 and that is formed with a plurality of radially disposed apertures 27.

Mounting plate 30 is attached to the lower surface of the panel 12 and has a raised part 32 therein which encloses cavity 34. Spindle 36 is attached to the raised part 32 of the mounting plate 30 and attached to the cross member 23 of the fork 20. A group of ball bearings 38 are held captive within confronting recesses formed in the raised part 32 and the cross member 23 thereby mounting the fork for rotation and forming a caster. There is an aperture 40 in the raised part 32 through which operating lever 42 is passed. The inner end of the operating lever is mounted for pivotal movement on pivot pin 43 that is carried by mounting ears in cavity 34, and the other end of the lever has a cam 44.

Push rod 46 is vertically slidable through the central bore 47 of spindle 36 and is attached to the arm 50 which is pivoted on pin 52, the latter being carried by the sides 22 and 21 of fork 20. Coil spring 56 having one end reacting on cross member 23 and the other end reacting on the arm 50 constantly presses the arm in an upward direction. However, the outer end portion of arm 50 bears on locking pin 59, the latter being mounted for vertical reciprocation and guided through aligned holes in guide bracket 60 and eye bolt 62 which are both carried by side 21 of the fork 20. Spring 64 seats on eye bolt 62 and on a reaction pin 66 carried by locking pin 59. Accordingly, the spring 64 tends to lift the locking pin and hold it separated from the locking apertures 27 at all times.

However, there is a wedge 70 at the end of lever 71, the latter being mounted for oscillation on pivot 72 that is carried by mounting plate 30. Link 73 is attached to the outer end of brake operating lever 71 and to the lower end of brake arm 75. When the brake arm is moved in one direction, the lever 71 is oscillated thereby moving the wedge 70 below and against cam 44. This causes the lever 42 to pivot in a down direction thereby actuating push rod 46 and depressing the arm 50 so that it urges the locking pin 59 downward and into one of the locking apertures 27 of hub 26. This motion is opposed yieldingly by springs 56 and 64 respectively, but the friction in the system is sufficient to hold the locking pin in place. Moreover, the brake lever 75, being mounted on pin 76 that is carried by depending bracket 78 on the creeper body panel 12, may have serrations, a ratchet and dog or some other type of holding device.

Link 80 is attached to brake arm 75 and to a brake operating lever 82 which corresponds to the brake operating lever 71 but operates wedge 84 for the brake of wheel assembly 19. Brake arm 90 is mounted on the opposite side of creeper body panel 12 from brake arm 75 and has links 92 and 94 by which to actuate the brakes for wheel assemblies 16 and 17. It is appreciated that the brakes need not be applied to all of the wheels, or if applied to all of the wheels, the mechanic may choose to use the brakes on one side or on the other side of the creeper. Accordingly, it is intended that it be clearly understood that brakes may be applied to any of the wheels or all of the wheels of the creeper. Moreover, it is apparent that the wheel assemblies 16, 17, 18 and 19 may each be identical to that described in detail, namely assembly 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A creeper comprising a creeper panel, a first wheel assembly, a second wheel assembly, a third wheel assembly, and a fourth wheel assembly, at least one of said wheel assemblies having brakes and all of the said wheel assemblies being attached to said panel, said brakes of said at least one wheel assembly comprising a locking pin, the wheel of said one wheel assembly having a plurality of locking apertures adapted to accommodate said locking pin, a spring reacting on said locking pin and tending to hold said locking pin separated from said locking apertures, an arm in contact with said locking pin, a push rod contacting said arm, a lever in contact with said push rod, a wedge slidable against one end of said lever to pivotally actuate said lever and thereby push said push rod, pivotally move said arm and displace said locking pin into engagement with one of said locking apertures, an axle on which said wheel is mounted for rotation, a fork having sides and a cross member, said sides mounting said axle, a spindle attached to said cross member, a mounting plate attached to the creeper panel and having said spindle secured thereto, said spindle having a passageway extending therethrough in which said push rod is disposed, said mounting plate having a raised part which encloses a cavity, one end of said push rod being disposed in said cavity and said lever being disposed in said cavity, said part of said mounting plate having an aperture through which one end of said lever is passed, and said wedge being disposed on the exterior of said cavity and engageable with the part of said lever which protrudes through said aperture in said raised part of said mounting plate.

2. The creeper of claim 1 wherein there is a brake arm mounted for pivotal movement on a side of said creeper panel, a link connected to said brake arm, a lever to which said wedge is secured and to which said link is connected whereby said wedge is moved in response to actuation of said brake arm.

3. The creeper of claim 1 wherein there are brakes on at least one other wheel assembly, and means interconnecting the brakes on said at least one wheel assembly and said at least one another wheel assembly for simultaneous operation thereof.

4. In a mechanic's creeper, a creeper panel having a plurality of caster wheel assemblies affixed thereto for moving the creeper along a supporting surface, and brake means associated with each caster wheel for selectively braking the same to hold the creeper stationary, each of said caster wheel assemblies including a mounting plate fixed to the undersurface of said panel and having a raised center portion forming a cavity between such portion and the undersurface of said panel, a fork member disposed below said mounting plate and journaling a wheel in the lower portion thereof, a hollow spindle rotatably connecting the mounting plate and fork, the axis of which is offset with relation to the axis of rotation of said wheel to permit castering of the wheel, said brake means including a push rod projected through said spindle and reciprocable therewithin, an operating lever pivoted at one end to said mounting plate within said cavity, said raised portion having an enlarged opening therein through which the opposite outer end of said operating lever projects with an intermediate portion thereof overlying said spindle in engagement with the upper end of said push rod, the outer free end of said operating lever normally resting against the underside of the mounting plate beyond the raised portion thereof, and a wedge element movable between the mounting plate and said outer free end of the operating lever to actuate the same downwardly to lock the associated wheel.

5. In a mechanic's creeper, a creeper panel having a plurality of caster wheel assemblies affixed thereto for moving the creeper along a supporting surface, and brake means associated with each caster wheel assembly for selectively braking the same to hold the creeper stationary, each of said caster wheel assemblies including a mounting plate fixed to the undersurface of said panel and having a raised center portion forming a cavity between such portion and the undersurface of said panel, a fork member disposed below said mounting plate and journaling a wheel in the lower portion thereof, a hollow spindle rotatably interconnecting the mounting plate and fork, the axis of which is offset with relation to the axis of rotation of said wheel to permit castering of the wheel, said brake means including a vertically reciprocable pin carried by said fork having a lower end portion receivable in one of a plurality of openings in said wheel, a lever pivotally carried at one end by said fork and having its opposite end overlying the upper end of said pin, means associated with said pin normally urging the same to an upper, retracted position with respect to said wheel, a push rod reciprocable through said spindle and engaged with an intermediate portion of said lever to move the same downwardly to engage said pin with said wheel, an operating lever pivoted at one end to said mounting plate within said cavity, said raised portion having an enlarged opening therein through which the opposite end of said operating lever projects with an intermediate portion thereof overlying said spindle in engagement with the upper end of said push rod, the outer free end of said operating lever normally resting against the underside of the mounting plate beyond the raised portion thereof, and a wedge element movable between the mounting plate and said other free end of the operating lever to actuate the same and lock the wheel.

References Cited in the file of this patent

UNITED STATES PATENTS

| | | |
|---|---|---|
| 740,267 | Gamble | Sept. 29, 1903 |
| 1,599,485 | Perrin | Sept. 14, 1926 |
| 2,345,442 | Winter et al. | Mar. 28, 1944 |
| 2,684,734 | Wilson | July 27, 1954 |